United States Patent
Mcqueen et al.

(10) Patent No.: US 12,495,064 B2
(45) Date of Patent: *Dec. 9, 2025

(54) SYSTEMS AND METHODS FOR ANALYZING NETWORK DATA TO IDENTIFY HUMAN AND NON-HUMAN USERS IN NETWORK COMMUNICATIONS

(71) Applicant: Yahoo Assets LLC, New York, NY (US)

(72) Inventors: Donald J. Mcqueen, Leesburg, VA (US); Lachlan A. Maxwell, Ashburn, VA (US); William C. Wakefield, III, McLean, VA (US)

(73) Assignee: Yahoo Assets LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,020

(22) Filed: Aug. 3, 2022

(65) Prior Publication Data

US 2022/0377104 A1    Nov. 24, 2022

Related U.S. Application Data

(63) Continuation of application No. 16/740,098, filed on Jan. 10, 2020, now Pat. No. 11,444,972, which is a (Continued)

(51) Int. Cl.
*H04L 29/06* (2006.01)
*G06F 21/31* (2013.01)
*H04L 9/40* (2022.01)

(52) U.S. Cl.
CPC ........ *H04L 63/1441* (2013.01); *G06F 21/316* (2013.01); *H04L 63/08* (2013.01);
(Continued)

(58) Field of Classification Search
CPC . H04L 63/1441; H04L 63/08; H04L 63/1425; H04L 2463/144; H04L 9/00;
(Continued)

(56) References Cited

U.S. PATENT DOCUMENTS

2005/0243984 A1    11/2005   Mahone et al.
2006/0026246 A1    2/2006    Fukuhara et al.
(Continued)

*Primary Examiner* — Joseph P Hirl
*Assistant Examiner* — Leynna Truvan
(74) *Attorney, Agent, or Firm* — Bookoff McAndrews, PLLC

(57) ABSTRACT

Systems and methods are disclosed for identifying human users on a network. One method includes receiving network data comprising data transmitted over a network over predetermined time period, the network data comprising a plurality of usernames and a plurality of events, wherein each of the plurality of events is associated with at least one of the plurality of usernames; determining a plurality of pairs, each pair of the plurality of pairs comprising a username of the plurality of usernames and an associated event of the plurality of events; determining qualifying pairs of the plurality of pairs, the qualifying pairs corresponding to a subset of the plurality of pairs that meet or exceed one or more predetermined event frequency thresholds; determining non-qualifying pairs of the plurality of pairs, the non-qualifying pairs corresponding to the subset of the plurality of pairs that do not meet or exceed one or more predetermined event frequency thresholds; generating at least one distribution associated with the qualifying pairs and non-qualifying pairs; and based on the at least one distribution, determining if at least one username of the plurality of usernames is associated with a human user or a non-human user.

20 Claims, 6 Drawing Sheets

Related U.S. Application Data continuation of application No. 15/604,354, filed on May 24, 2017, now Pat. No. 10,567,421.

(52) U.S. Cl.
CPC .. *H04L 63/1425* (2013.01); *G06F 2221/2133* (2013.01); *H04L 2463/144* (2013.01)

(58) Field of Classification Search
CPC ......... H04L 9/006; H04L 9/08; H04L 9/0863; H04L 9/3213; H04L 9/3226; H04L 9/3231; H04L 9/3263; H04L 9/3273; H04L 12/2807; H04L 12/2858; H04L 41/0233; H04L 61/00; H04L 61/106; H04L 61/2535; H04L 45/72; H04L 45/74; H04L 61/2503; H04L 61/4535; H04L 61/5007; H04L 63/0236; H04L 63/1416; H04L 9/085; H04L 43/16; G06F 21/316; G06F 2221/2133; G06F 12/10; G06F 3/1231; G06F 11/3471; G06F 9/542; G06F 11/3072; G06F 21/554; G06F 2201/86; G06F 12/1483; G06F 2201/81; A61B 6/508; A61K 49/0008; G05B 3/1231; G05B 2219/31335; G05B 2219/33038; G05B 2219/31186; G11B 2020/10796; G11B 2020/1074; G06V 20/44; H04M 15/8278; H04M 2215/788; H04B 2201/71376; H04N 1/00769
See application file for complete search history.

(56) References Cited

U.S. PATENT DOCUMENTS

| | | | |
|---|---|---|---|
| 2014/0019488 A1 | 1/2014 | Wo et al. | |
| 2016/0112538 A1* | 4/2016 | Wo | H04L 67/535 709/225 |
| 2016/0299923 A1* | 10/2016 | Nefedov | G06F 21/552 |
| 2017/0070524 A1* | 3/2017 | Bailey | H04L 67/303 |
| 2017/0237771 A1* | 8/2017 | Miroshnikov | H04L 63/1466 726/23 |

* cited by examiner

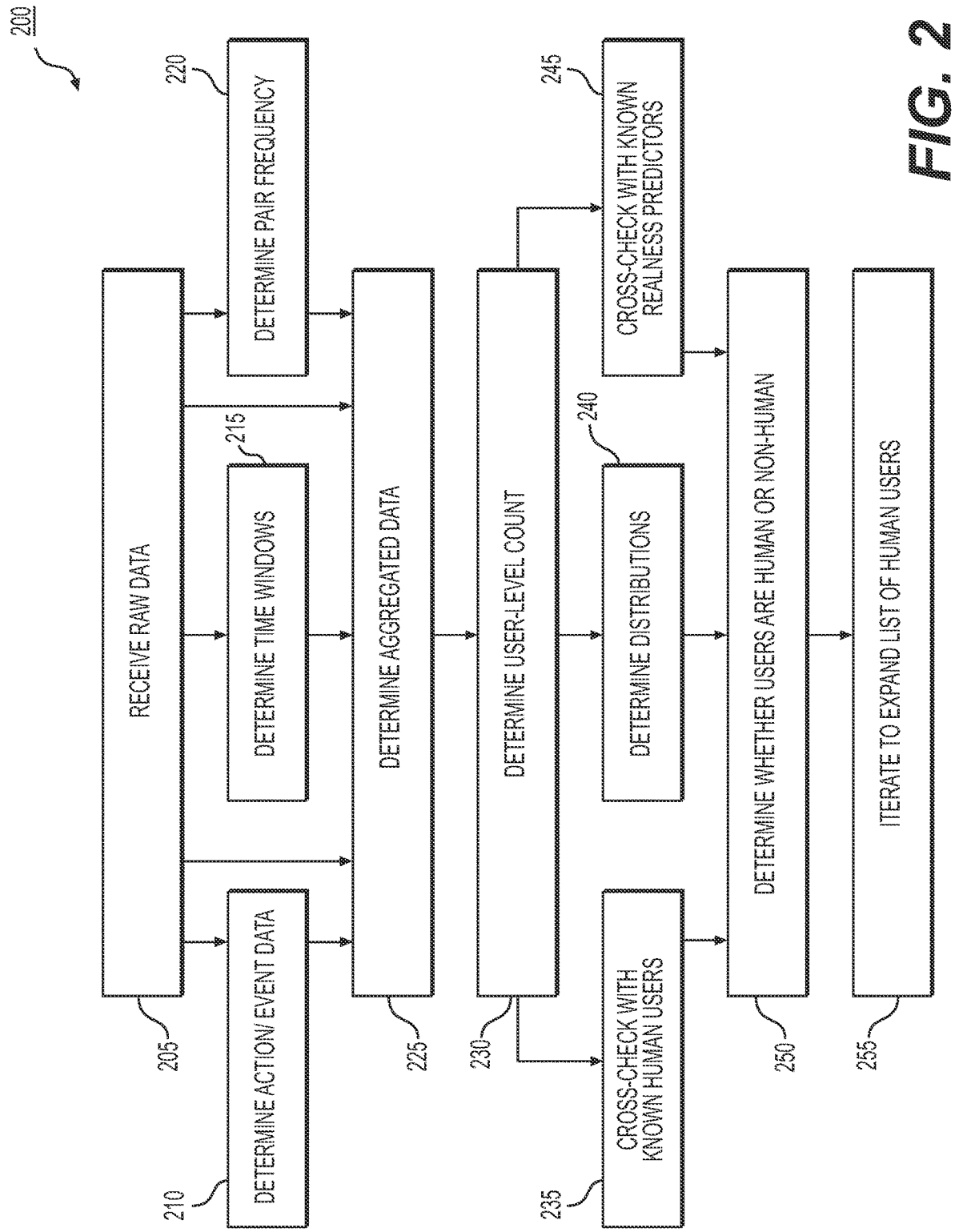

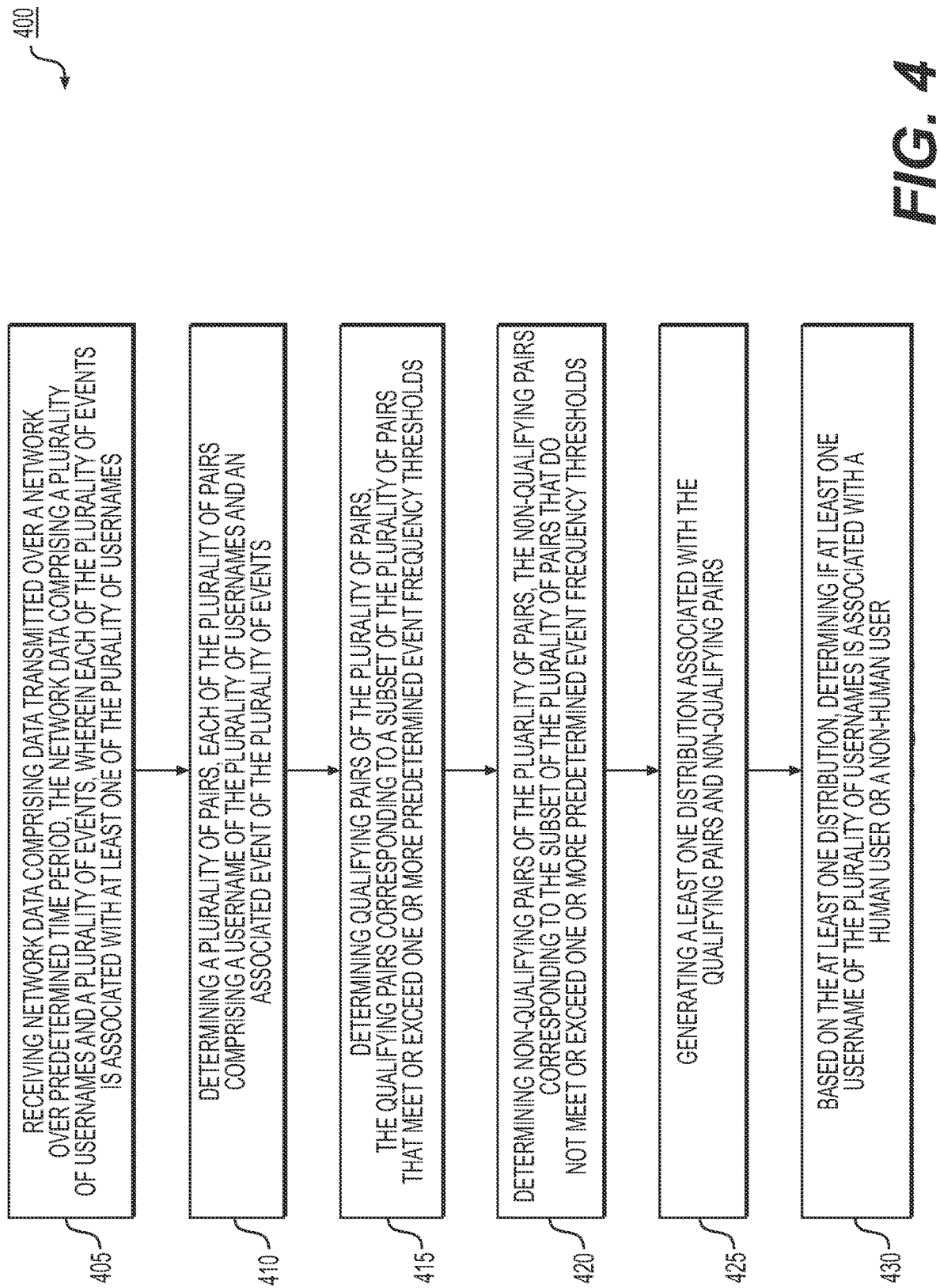

SYSTEMS AND METHODS FOR ANALYZING NETWORK DATA TO IDENTIFY HUMAN AND NON-HUMAN USERS IN NETWORK COMMUNICATIONS

CROSS-REFERENCE TO RELATED APPLICATION(S)

This patent application is a continuation of and claims the benefit of priority to U.S. application Ser. No. 16/740,098, filed Jan. 10, 2020, which is a continuation of and claims the benefit of priority to U.S. application Ser. No. 15/604,354, filed May 24, 2017, now U.S. Pat. No. 10,567,421, the entireties of which are incorporated herein by reference.

TECHNICAL FIELD

The present disclosure relates to systems and methods for identifying human users in electronic networks.

BACKGROUND

In addition to typical Internet traffic coming from Internet users, many websites are subjected to various forms of malicious traffic. Malicious users and bots may flood websites with comment spam, links to malicious software, and ingenuine clicks, visits, hits, etc. Users of electronic messaging systems, such as electronic mail, texting, and social media applications, may also disseminate spam and other ingenuine links and materials. Various forms of fraud and fraudulent solicitations may also be disseminated.

Conducting effective anti-abuse often depends upon being able to accurately distinguish abusive/fraudulent users from genuine users. Yet, abusers commonly alter their behavior to better mimic genuine users, creating an arms race between abuse detection techniques and detection avoidance techniques.

Accordingly, solutions are needed to be able to more accurately identify human from non-human accounts.

SUMMARY OF THE DISCLOSURE

Embodiments of the present disclosure include systems and methods for identifying human users on a network.

According to certain embodiments, computer-implemented methods are disclosed for identifying human users on a network. One method includes receiving network data comprising data transmitted over a network over predetermined time period, the network data comprising a plurality of usernames and a plurality of events, wherein each of the plurality of events is associated with at least one of the plurality of usernames; determining a plurality of pairs, each pair of the plurality of pairs comprising a username of the plurality of usernames and an associated event of the plurality of events; determining qualifying pairs of the plurality of pairs, the qualifying pairs corresponding to a subset of the plurality of pairs that meet or exceed one or more predetermined event frequency thresholds; determining non-qualifying pairs of the plurality of pairs, the non-qualifying pairs corresponding to the subset of the plurality of pairs that do not meet or exceed one or more predetermined event frequency thresholds; generating at least one distribution associated with the qualifying pairs and non-qualifying pairs; and based on the at least one distribution, determining if at least one username of the plurality of usernames is associated with a human user or a non-human user.

According to certain embodiments, systems are disclosed for identifying human users on a network. One system includes a data storage device that stores instructions for identifying human users on a network; and a processor configured to execute the instructions to perform a method including: receiving network data comprising data transmitted over a network over predetermined time period, the network data comprising a plurality of usernames and a plurality of events, wherein each of the plurality of events is associated with at least one of the plurality of usernames; determining a plurality of pairs, each pair of the plurality of pairs comprising a username of the plurality of usernames and an associated event of the plurality of events; determining qualifying pairs of the plurality of pairs, the qualifying pairs corresponding to a subset of the plurality of pairs that meet or exceed one or more predetermined event frequency thresholds; determining non-qualifying pairs of the plurality of pairs, the non-qualifying pairs corresponding to the subset of the plurality of pairs that do not meet or exceed one or more predetermined event frequency thresholds; generating at least one distribution associated with the qualifying pairs and non-qualifying pairs; and based on the at least one distribution, determining if at least one username of the plurality of usernames is associated with a human user or a non-human user.

According to certain embodiments, a non-transitory computer readable medium is disclosed that stores instructions that, when executed by a computer, cause the computer to perform a method for identifying human users on a network. One method includes receiving network data comprising data transmitted over a network over predetermined time period, the network data comprising a plurality of usernames and a plurality of events, wherein each of the plurality of events is associated with at least one of the plurality of usernames; determining a plurality of pairs, each pair of the plurality of pairs comprising a username of the plurality of usernames and an associated event of the plurality of events; determining qualifying pairs of the plurality of pairs, the qualifying pairs corresponding to a subset of the plurality of pairs that meet or exceed one or more predetermined event frequency thresholds; determining non-qualifying pairs of the plurality of pairs, the non-qualifying pairs corresponding to the subset of the plurality of pairs that do not meet or exceed one or more predetermined event frequency thresholds; generating at least one distribution associated with the qualifying pairs and non-qualifying pairs; and based on the at least one distribution, determining if at least one username of the plurality of usernames is associated with a human user or a non-human user.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts a flow diagram of exemplary methods for identifying human users on a network, according to an exemplary embodiment of the present disclosure;

FIG. 4 depicts a flow diagram of an exemplary method for identifying human users on a network, according to an exemplary embodiment of the present disclosure.

DETAILED DESCRIPTION OF EMBODIMENTS

Specific embodiments of the present disclosure will now be described with reference to the drawings. As will be recognized, the present disclosure is not limited to these particular embodiments. For instance, although particular steps in particular embodiments may be discussed, steps from one embodiment may be used in other embodiments. Further, any step discussed in relation to any particular embodiment may be optional. This may be because, for example, certain steps may enhance the effectiveness of certain embodiments, while not strictly being necessary for the embodiment to function as intended.

The present disclosure relates to systems and methods for identifying human users on a network. Many websites experience various forms of malicious or fraudulent traffic. Sites may receive comment and posting spam, or other malicious or spam content submissions. Malicious users and/or bots may further drive up hits, visitors, or ad views/clicks for various purposes. For example, malicious bots may interact with advertisements to generate additional ad revenues for website owners or ad networks. Non-human users engaging in spam dissemination or malicious activity is particularly prevalent in electronic messaging applications such as e-mail, text, and social messaging applications.

The ability to quickly and efficiently identify features in data which can help separate human users from non-human users is of great importance. However, some possible techniques for detecting non-human users are time-consuming and unreliable. Generating data sets and running queries may be slow, and validating any output may be difficult. Additionally, some possible techniques may have a low success rate in finding features that reliably distinguish between human and non-human accounts.

Figure 1:
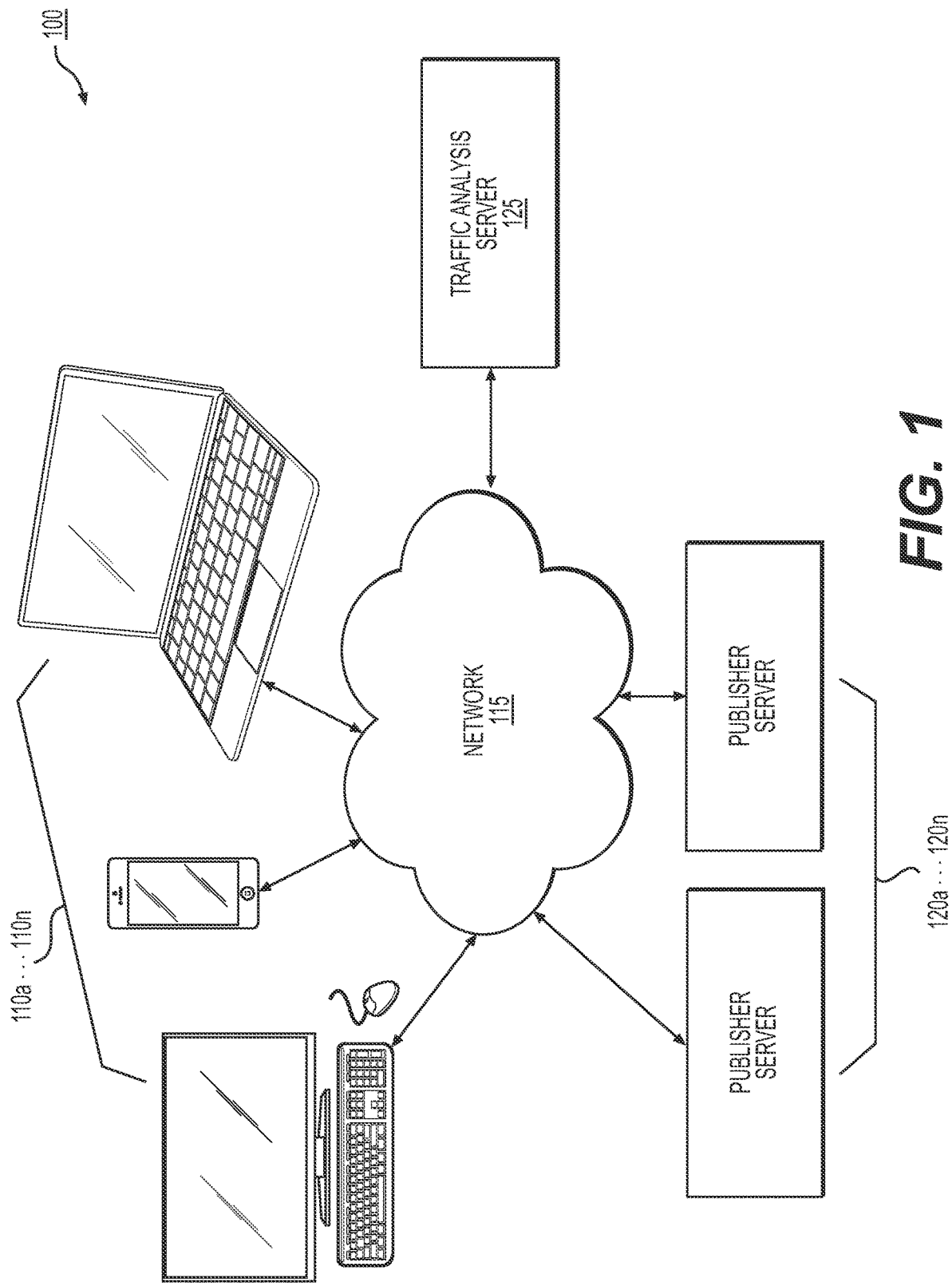
FIG. 1 depicts a schematic diagram of a network environment in which methods are practiced for identifying human users on a network, according to an exemplary embodiment of the present disclosure.

FIG. 1 depicts a schematic diagram of an exemplary network environment 100 for identifying human users on a network, according to an exemplary embodiment of the present disclosure. As shown in FIG. 1, the environment 100 may include at least one network device 110a-n, an electronic network 115, at least one publisher server 120a-n, and at least one traffic analysis server 125. Network devices 110a-n may include laptop and desktop computers, Internet-enabled mobile devices, or any Internet-enabled device. Electronic network 115 may be, for example, the Internet, but may also be or comprise a Local Area Network (LAN), Wide Area Network (WAN), Wireless Local Area Network (WLAN), Metropolitan Area Network (MAN), and/or Storage Area Network (SAN), etc. A website may be hosted by a publisher server 120 so that it is made accessible to one or more of network devices 110a-n. The publisher server 120, which may be a content delivery network (CDN), may further determine an ad server and/or an ad exchange to provide an ad included in the website provided to a network device 110. The traffic analysis server 125 may analyze network traffic exchanged between network devices 110a-n and publisher servers 120a-n in accordance with techniques presented herein. Although the traffic analysis server 125 is depicted as separate from the publisher servers 120a-n, in some embodiments, the functions performed by the traffic analysis server 125 may be performed on a publisher server 120. Further, steps of the methods depicted in FIGS. 2-4 may be practiced on a combination of devices depicted in FIG. 1.

FIG. 2 depicts a flow diagram of an exemplary method 200 for identifying human users on a network, according to an exemplary embodiment of the present disclosure. Although the steps shown in FIGS. 2 and 4 are numbered sequentially for purposes of explanation, as will be apparent, the steps do not necessarily need to be performed in the listed order. Further, while FIGS. 2 and 4 are discussed separately, steps discussed in relation to, for example, FIG. 2 may be implemented in the context of FIG. 4, and vice versa. Generally speaking, techniques practiced in relation to any one figure may be practiced in relation to any other figure. Techniques discussed in relation to FIGS. 2-4 may be performed on, for example, one or more traffic analysis servers 125, one or more publisher servers 120a-n, a combination of the two, or in combination with other network-accessible devices.

As shown in FIG. 2, a system, such as traffic analysis server 125, at step 205 may receive data, such as web traffic data, over electronic network 115. The data may be raw data, or processed and/or formatted data. The data may be forwarded by one or more publisher servers 120a-n, or received directly as the traffic analysis server 125 acts as a proxy. For example, any or all data sent between network devices 110a-n and publisher server 120 may first pass through traffic analysis server 125. Alternatively, the data may be periodically forwarded to the traffic analysis server 125 in batch form, or as it is sent or received to and/or from the publisher server 120. The data received may comprise browsing and other website interaction data, and/or electronic messaging data. The basic data types received may be referred to as variables, such as sender and/or destination Internet Protocol (IP) addresses, dates associated with the traffic, usernames or other user identifiers, sender information and/or sender identifiers, read or ignored data, success/failure to authenticate information, dated/timestamped user-action/event pairs, whether electronic messages were read or ignored, geographic information of the Internet Protocol (IP) address or other identifiers, device information such as computer make, model, type, and/or specifications, user demographic information, browsing history, web cookie data, and browser or other device and/or software identifiers.

At step 210, the system may determine action and/or event level data, for example, at the traffic analysis server 125. For example, raw data may be summarized by volume, frequency, type, etc. One or more splits may be determined, where each split defines a threshold for demarcating human vs. non-human activity. For example, if one user sends three e-mails in one second, this frequency may exceed a threshold for human activity and enter a frequency range of non-human activity. Splits may be determined for a summary feature and labeled for each action and/or event based on which side of the threshold the variable falls for a given user. The system may focus on a non-user-level summary feature. For example, if a variable pairing is username and IP address, the system may determine if a given username is spread in a humanlike or non-humanlike manner across other IP addresses. For example, a human may log in both from IP addresses that many users use (like a coffee shop IP address), as well as from an IP address that few users use (like a private residence). Bots, on the other hand, may spread evenly across IP addresses, as a spammer may have purchased a given number of IP addresses and load balance usage by bots. As a result, bots may distribute differently on a curve of users per IP address. The split determined for each pair may the form the second paired variable, or "B" side, for which counts may be later determined in step 225 discussed below.

At step 215, the raw data, which comprises data over a predetermined time range, may be divided into sub-time windows. Sub-time windows may comprise, for example, weeks or months. Variable pairs may be determined and/or generated, and may be associated with one or more sub-time windows. Variable pairings may be considered candidate features, where a feature is a predictive or potentially predictive variable set. The data may illustrate pair presence and frequency for each determined threshold. A threshold or split count and intra-split frequency thresholds may be determined. The system may determine if a given user or users behave consistently within time and/or sub-time windows, as will be explained further below.

At step 220, pair frequency thresholds may be determined. For example, if the raw data has variables for successful logins and/or unsuccessful logins, frequency thresholds may be determined for a number of successful logins that indicate that the user is likely a human, and/or a number of unsuccessful logins that indicate that the user is likely non-human. Alternatively or in addition, the system may seek to determine if the behavior of a given user is incidental or intentional and consistent. It may be determined, for example, if a given user is reading a given sender's messages enough to meet a threshold of consistency. It may also be determined, for example, if the user is logging in often enough from a given IP address to meet a threshold of consistency. Steps 210, 215, and/or 220 may be optional.

At step 225, pair level data may be aggregated and/or further aggregated. Raw data may be collapsed to a pair level along with any associated counts. Action and/or event level data may be joined and labels may be created for one or more pairs based on a determined split/threshold. Pair frequency data and created labels for each identified split/threshold may be joined. Time sub-window data may be joined and labels may be created based on any identified thresholds. Labels may indicate, for example, if any associated threshold has been exceeded. An overall flag for each pair may be set. The flag may indicate if the pair meets all or some predetermined number of thresholds that the pair qualifies as human. If one or more pairs do not meet one or more of the identified thresholds, the flag may also be set to indicate that the pair may not be human.

For example, many users check their messages at least once or twice per week. From step 215, a 60-day data set might be broken up into 6 time splits of 10 days each. A subsequent plot may be generated of users message read and/or ignore behavior for each sender. Each sender/recipient pair may be based on how the user's behavior lines up with the rest of the population. The system may determine how many out of the 6 time splits a given user reads a given sender's messages (the 'split threshold' or 'split-level threshold'). The system may also determine, within each 10-day split, on how many unique days does the given user read the given sender's mail (an 'infra-split threshold'). A similar technique could be followed to determine consistence in the IP addresses a person uses, based on authentication success/failure data. Users who exceed the derived thresholds in the combination of steps 215 and 220 are the ones that may receive a "Q" for qualifying in step 225.

At step 230, user-level population data may be determined. User-level counts may be created that separate qualifying from non-qualifying pairs from the aggregated pair data. Thresholds of significance may be determined for each user-level count. Each threshold of significance may be joined to the user-level data, for example, as a Boolean. Users for whom all booleans in step 230 are true (which may mean that they exhibit statistically significant interactions in all buckets formed by the product of the flags in step 210 with the qualifying/not qualifying determination from step 225) may be a starting population of users that the feature that the system predicts to be human. This starting population may be refined and expanded in subsequent steps, as will be explained below.

In this manner, flags from step 210 may be combined with the qualifying or not qualifying determinations from step 225. For example, for an embodiment regarding messaging systems, a flag from step 210 may be "other people read this sender's mail" (RBO) or not (NRBO), so the four variables would be Q-RBO, Q-NRBO, NQ-RBO, and NQ-NRBO given the two variables. Human users might typically have instances in all four variables: the user reads the message and so do others, the user reads it but few others do, the user doesn't read it but other people do, and the user doesn't read it and neither do others. But bots, for example, might not read any messages, regardless of whether others do, or at least might not read messages consistently across multiple time windows.

At step 235, a list of known human users may be determined or imported. This list may be used in later steps to help determine if other users are human. At step 240, distributions may be determined. For example, for each qualifying or not-qualifying pair count, side-by-side distribution plots may be graphed, and may split on whether a given user is human, such as with a true or false boolean. Alternatively, a graph need not be generated, but rather the distribution of data may be analyzed. As shown in FIGS. 3A-3D, the X-axis of each plot may be the qualifying or not qualifying count 305, and the Y-axis may be the number of users 310. For human users, many will have low to medium counts of each qualifying/not qualifying component, and will follow a descending curve toward the higher counts (see FIG. 3A). Bots and/or abusive users may show little to no activity in the qualifying/non-qualifying plots, instead having a large spike at x=0. Non-qualifying activity counts can vary widely, but generally it will either fall more heavily on higher count values and cap out at much higher than human users (FIG. 3B), be mostly non-existent (FIG. 3C), or be highly concentrated (FIG. 3D).

At step 245, data may be cross-checked for overlap with other features that predict humanness. For example, it may be noted if the user is associated with a trusted IP address. Other features may include if the user shows a humanlike pattern of logins. For example, it may be considered if a user logs in consistently from an IP address that is probably a home, logs in from an IP address that is probably an office, logs in occasionally from diverse IP addresses like at a coffee shop, and/or logs in infrequently but consistently from another private residence. Although discussed in examples herein, steps, 235, 240, and 245 may be optional steps. If the user always uses a small set of devices (device profiles), that may also further support the user being considered human. If the user follows a consistent and/or sensible geo-profile, that may support the user being considered human. Whether the user has a believable address book may also be considered, and may be considered both independently and in the context of other users.

Other features could also be joined as external sources. For example, it may be considered by the system whether the user confirmed a non-VOIP or other mobile number via text message. The system may determine whether the user pays for features. The system may also determine if confirmation information, for example, a confirmation phone number, is used by more than a predetermined number of additional accounts (too many may indicate non-human behavior). These external sources of information may serve as a reference to fine tune the system to identify humans most accurately.

At step 250, it may be determined whether one or more of the users is human or non-human. Based on the form of the distributions in step 240, and any cross-checking with features/lists in steps 235 and 245, the list of users tripping any or all Booleans may be considered real humans. Although, some data scrubbing for outliers in intermediate data may be occasionally used to achieve clean data distributions.

At step 255, based on the results of step 250, if there are users that may be close to qualifying as humans, but are not classified as such, the thresholds impacting qualification Q may be adjusted, and steps 225 through 250 may be repeated. If any new users achieve a known human distribution, those users may be re-classified as human. This step may be iterative, and may be optional.

One example of an implementation related to electronic messaging will now be discussed. Electronic messages may include e-mails, text messages, social media messaging, etc. At step 205, raw data may be received with variables such as dates, electronic messaging recipient, electronic messaging sender, whether the message was read or ignored, and any other electronic message metadata and/or network metadata.

At step 210, action and/or event level data may be determined. For example, it may be determined what number or portion of users read one or more sender's electronic messages. One or more threshold may be determined to identify senders whose electronic messages are read by others (RBO). If variable pairings are email recipient and email sender, for example, a threshold may be determined to label the sender as "someone whose mail people tend to read." The system may determine a threshold based upon the assumption that human users tend to read mail both from senders that other users tend to read, and from some that other users don't (private communications, etc. . . . ). The split determined for each pair may the form the second paired variable for which counts may be later determined in step 225 discussed below.

At step 215, time sub-windows may be determined. For example, for a given pair of variables, it may be determined in how many "n-day" windows did the pair appear out of the last "y" days. Determined "n-day" and "y-day" thresholds may capture consistent communication patterns. The windows determined may be any time deviation, including minutes, hours, weeks, etc.

At step 220, pair-level frequency data may be determined. For example, it may be determined how often each electronic message associated with a given variable was read in the past predetermined time window, for example 60 days. Independent and commingled thresholds may be determined for reads and/or ignores to capture engagement. Steps 210, 215, and/or 220 may be optional.

At step 225, aggregated data may be determined. Aggregated/joined data sets may be generated, for example by pairing sets of variables from the raw data. Pairs that exceed a predetermined number of thresholds of electronic messages reads and ignores may be identified as qualifying (Q). A pair may be determined as qualifying, for example, if all associated thresholds are met or exceeded. Additional factors for being determined as qualifying (Q) may include a predetermined level of reception of electronic messages from the user by others (others read the messages), and a predetermined level of interaction with electronic messages (the user reads electronic messages).

At step 230, user-level population data may be determined. One or more user counts may be created based upon data determined in previous steps. For example, variables may be created associated with users corresponding to qualifying and electronic messages read by others (Q-RBO), qualifying and not read by others (Q-NRBO), not qualifying and read by others (N-RBO), and/or not qualifying and not read by others (N-NRBO). Significance thresholds may be determined for each variable, and each user may be labeled accordingly, for example with Booleans. Predicted human users may be determined as having 'true' for all labels/variables. At step 235, the user-level counts may be checked against a known human user list. This step may be optional. If the user-level counts do not overlap with the known human user list more than a predetermined level, the thresholds may be automatically reset to ensure greater conformity.

At step 240, distributions may be determined. Human users may demonstrate low to medium Q-RBO pairs, for example up to fifteen, low but extant Q-NRBO (1-3), and medium to high N-RBO and N-NRBO (10-30). Users not determined to be human may show no Q activity, and little to no N activity. This may be because bot accounts often tend to invite users to respond to a different single aggregated account rather than the source bot's address, since the bot system is probably using thousands of accounts and couldn't monitor the messages the accounts would receive independently. Thus, bot accounts may tend to receive no electronic messages, or very limited electronic messages from a few senders whose mailing lists they were signed up for on creation. Electronic messages that non-human accounts receive are rarely read, and if read, are rarely read consistently. There may be no Q activity due to this lack of consistency, and since there is little or no messages received at all, there may be little on the N side either. There may instead simply be a spike at 0 on the X-axis of the relevant plot(s). These factors may be incorporated into the determination as to whether any given user account is human or non-human.

At step 245, as an option, other known predictors of humanness may be considered. For example, mail system features and a predetermined number of believable logins associated with the users, for example over a predetermined time period, may be considered.

At step 250, based on the above-determined features, it may be determined whether a user is real/human. Based on the distributions, and/or cross-checks with existing features and lists of known users, any newly determined features may be considered. Steps 210-250 may be iterated, with thresholds being tweaked with each iteration, in order to more reliably determine whether each user is human or non-human, and/or to ensure greater conformity with any lists of known humans or non-humans.

At step 255, further modifications and iterations may be performed. For example, some users communicate infrequently but the communications may still be desired. To account for this situation, the formula for Q may be modified to allow for 100% reads for a variable pair, if the sending frequency is low, but extant. This may be account for other individuals sending direct (personal) emails.

Another example associated with FIG. 2 will now be discussed, focusing on login attempt analysis. At step 205 raw data may be received, which may include variables such as date, username, login IP address, and/or authentication attempt results (e.g. succeed or fail).

At step 210, account and/or event level data may be determined. For example, a number of users that succeed in login authentication from each IP address may be determined. Thresholds may be determined for high-volume IP addresses versus more normal-volume IP addresses. For example, an IP address associated with a public library may have a different threshold from an IP address associated with a private residence. Thus, authentication success thresholds may be set based upon login volume, IP address location, overall traffic volume, etc.

At step 215, time sub-windows may be determined. For example, variable pairings may be evaluated to determine how often the pair appears in 'N' unique days out of the last 'Y' months. N and Y thresholds may be determined to capture login consistency. At step 220, pair frequency data may be determined. For example, it may be determined how many times each pair succeeded and failed in the last 'X' days. Authentication failure and success thresholds may be determined for active users.

At step 225, pair data may be aggregated and/or joined. Pairs that exceed thresholds for login successes/failures in X days may be determined as qualifying (Q). Consistency thresholds for sufficient months out of the last Y months with at least N unique login days may further be factored in determining if a pair is qualifying Q.

At step 230, user data may be determined. For example, user-level counts may be created based upon received variables and/or pair data. For example, four counts may be generated based on qualifying high volume IP addresses (Q-HV_IP), qualifying normal volume IP addresses (Q-NV_IP), non-qualifying high volume IP addresses (N-HV_IP), and non-qualifying normal volume IP addresses (N-NV_IP). Variables based upon additional or fewer categories of volume and levels of qualification may also be generated. Significance threshold may be determined for each variable, and each user may be labeled accordingly, for example with Booleans. Predicted humans users may be determined as having 'true' for all labels/variables At step 235, a cross-check may be performed with known human users. At step 240, distribution plots may be generated. Predicted human users typically show distributions starting with low counts for each category (e.g., 1-3 pairs), and tapering off by a dozen pairs. Those considered non-human might show little to no activity on the Q plots. On the N plots, non-human users may be tend to have more pairs with both high volume and normal volume IP addresses (e.g. 10-20 pairs, or into the hundreds).

At step 245, the data may be cross-checked with known humanness predictors, such as mail-send IP addresses (IP addresses from which a given user consistently sends messages).

At step 250, a final determination may be made as to whether the users are human or non-human. Based on the distributions determined in step 240, and by possibly cross-checking with existing features and lists, one or more newly determined features may be accepted.

At step 255, steps described in this embodiment may be iterated, and threshold levels adjusted, to help determine users that are near the human/non-human threshold, which may cause the predicted human list to expand. Many devices have stored passwords, and would therefore have 100% authentication success rate. The formula for Q may be modified to allow only successes (or only failures with the same password), instead of requiring both, at higher threshold values of login frequency and consistency. This may result in a larger number of predicted human users.

Figure 3A:
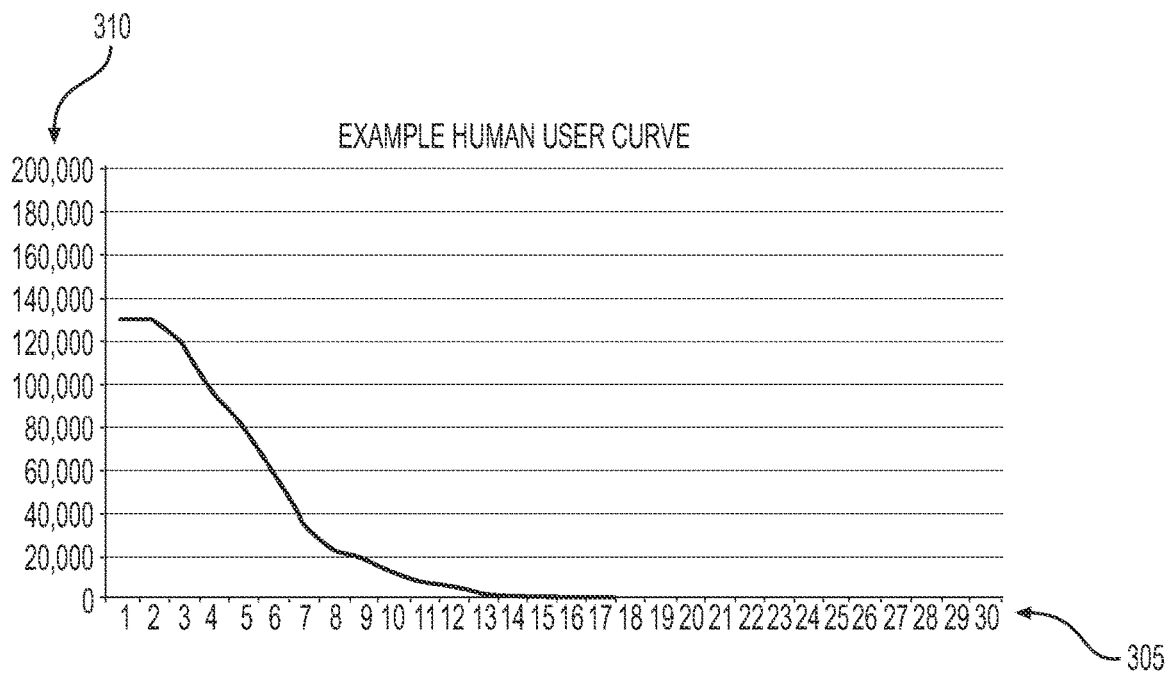
FIGS. 3A-3D depict graphs associated with exemplary methods for identifying human users on a network, according to an exemplary embodiment of the present disclosure.
Figure 3B:
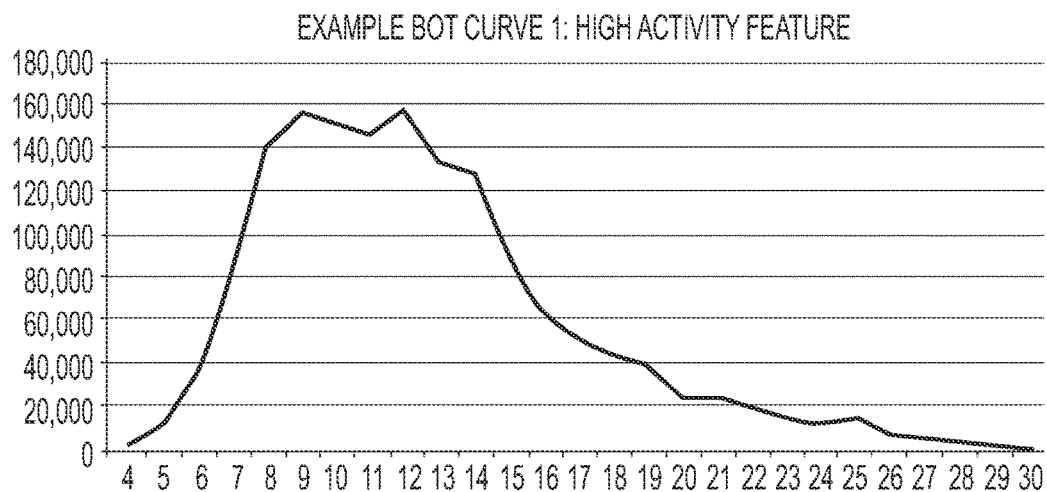
Figure 3C:
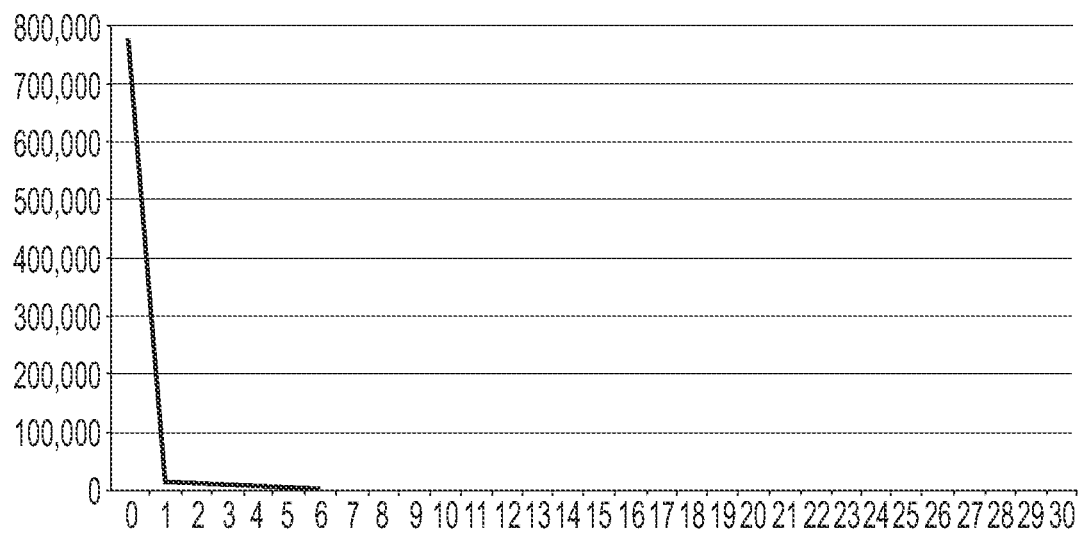
Figure 3D:
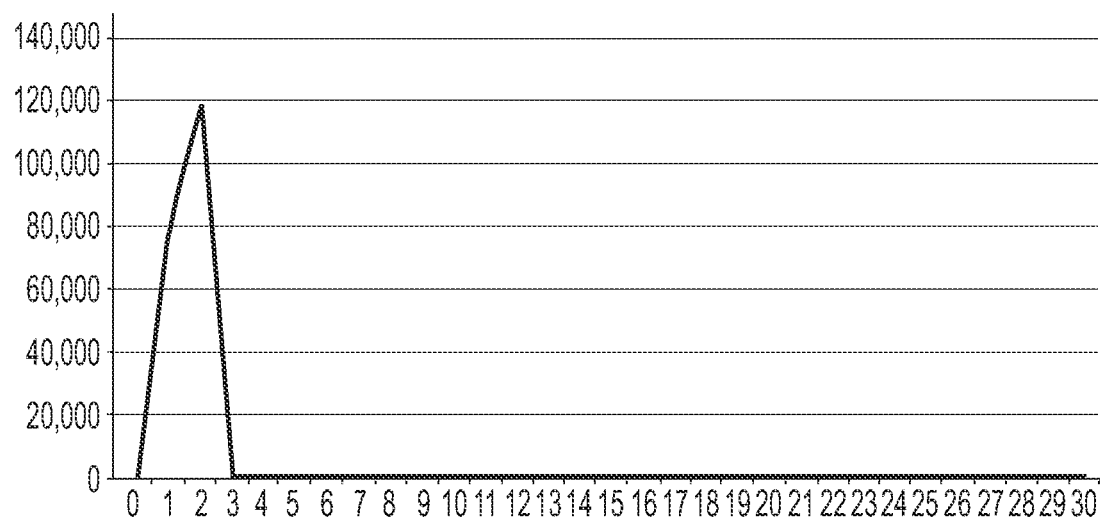

FIGS. 3A-3D depict graphs associated with exemplary methods for identifying human users on a network, according to an exemplary embodiment of the present disclosure. These figures may display pair/feature counts on the X-axis 305, and number of users on the Y-axis 310. FIG. 3A shows an example human activity distribution. FIG. 3B shows an example non-human distributed activity curve. FIG. 3C shows an example non-human minimal activity curve, and FIG. 3D shows a concentrated human activity curve.

These graphs may be generated in pairs, with one plotting the distribution of the users being predicted as human in step 230, and the other a graph predicting non-human users. A set of these graphs may be generated for each variable generated in step 230, and the human graph may be compared to the non-human graph. For example, for the electronic messaging embodiment discussed herein, two graphs may be generated each for Q-RBO, Q-NRBO, N-RBO, and N-NRBO. If the feature has appropriate thresholds set to predict human-ness, the human graphs may look similar to FIG. 3A, because humans typically act consistently at least "a little bit" and inconsistently at least "a little bit." This consistency or lack of consistency may apply to any or all variables, including log-in location, devices used, communicating with other users, succeeding/failing at login, or indicating that messages are spam. In contrast, bots may typically lack diversity of behavior one way or another. The same bot username might rarely do the same thing the same way repeatably through time. Bots might claim to be logging in from highly diverse locations, or always the same location. Bots might always claim to be using the exact same version of the exact same browser on the exact same device, or the claimed browser type, version number, and device might be different every time. Bots might send large volumes of messages to other users they've never interacted with before, or might never fail a password, or might never provide feedback as to whether messages they receive are spam.

As a further example, the system might build a model to determine if users are likely human by assessing if the users have a believable array of devices. Human users might have a home PC with various browsers, a work PC with various browser, a tablet, smartphone, and occasionally access public computers, etc. Raw data received may include a date, username, device, and action taken. Step 210 variables might be set to be high/low activity devices based on daily actions taken on the days the device is used. Steps 215 and 220 might establish thresholds for consistent usage of a given device over time. Variables for might be qualifying/ not qualifying based on consistency, and high/low utilization devices. Human users might typically have devices that fall into all four possibilities: "used often and you do a lot while using it" (e.g., when on a smartphone), "used often, but fewer actions per use" (e.g., when on a home PC), "not used often but you do a lot while using it" (e.g., on a tablet), and "not used often and you don't do much when you do" (e.g., on an alternative browser). Two graphs for each of the four variable combinations may then be created at step 240. Humans may be likely to have activities on all graphs, while bots may show much activity on some graphs, and none on others. Bots may use dozens to hundreds of devices, and inconsistently over time, for example, as shown in FIG. 3B. Or, bots may always claim to be the same thing (e.g., a Firefox browser that disallows cookies, so no device profile exists). Even if a bot were to be labeled human, it would likely be caught when cross-referenced, for example, with a list of users who consistently log in from the same IPs, as shown in steps 245 and 250. The system may be tuned at step 255, for example, to relax certain thresholds to capture borderline cases. For example, if a possible human user doesn't log anything on "device not used often and few actions when used" chart, this might be forgiven, and the user may be labeled human nonetheless.

FIG. 4 depicts a flow diagram of an exemplary method for identifying human users on a network, according to an exemplary embodiment of the present disclosure. At step 405, network data may be received comprising data transmitted over a network over predetermined time period, the network data comprising a plurality of usernames and a plurality of events, wherein each of the plurality of events is associated with at least one of the plurality of usernames. At step 410, a plurality of pairs may be determined, each pair of the plurality of pairs comprising a username of the plurality of usernames and an associated event of the plurality of events. At step 415, qualifying pairs of the plurality of pairs may be determined, the qualifying pairs corresponding to a subset of the plurality of pairs that meet or exceed one or more predetermined event frequency thresholds. At step 420, non-qualifying pairs of the plurality of pairs may be determined, the non-qualifying pairs corresponding to the subset of the plurality of pairs that do not meet or exceed one or more predetermined event frequency thresholds. At step 425, at least one distribution plot may be generated associated with the qualifying pairs and non-qualifying pairs. At step 430, based on the at least one distribution plot, it may be determined if at least one username of the plurality of usernames is associated with a human user or a non-human user.

The methods discussed in relation to FIGS. 2-4 substantially improve the technical field, by enabling better detection of human and non-human users. Embodiments herein describe a robust identification and scoring system to create and update records for determined human users. Human-indicative features may be extracted from network traffic on electronic systems. Techniques described herein leverage humanlike qualifies such as having a home base, having habitual behaviors, looking like other users, acting like other users, interacting with other users, having relationships with other users, minimizing complexity and making mistakes. Identified pairs of variables may form a hypothetical feature that may predict human or non-humanness, and these features may be quantified or graphed. While the 'embodiments' component may not be required, and any quantifiable features may be able to be tested for a human vs. non-human distinction, features tapping into predictive variables tend to result in more accurate results. Once a feature is created, logical and statistical tests may be performed to determine if it creates a valid and believable distribution. The steps may be repeated with other possible features to form a highly predictive feature set. Hypothetical features may be cross-referenced to find any overlapping predictions. The strongest overlapping features may then be fed into a learning algorithm that weighs and sums the contributing vectors in order to predict human or non-humanness for a given user with a high degree of accuracy.

Figure 5:
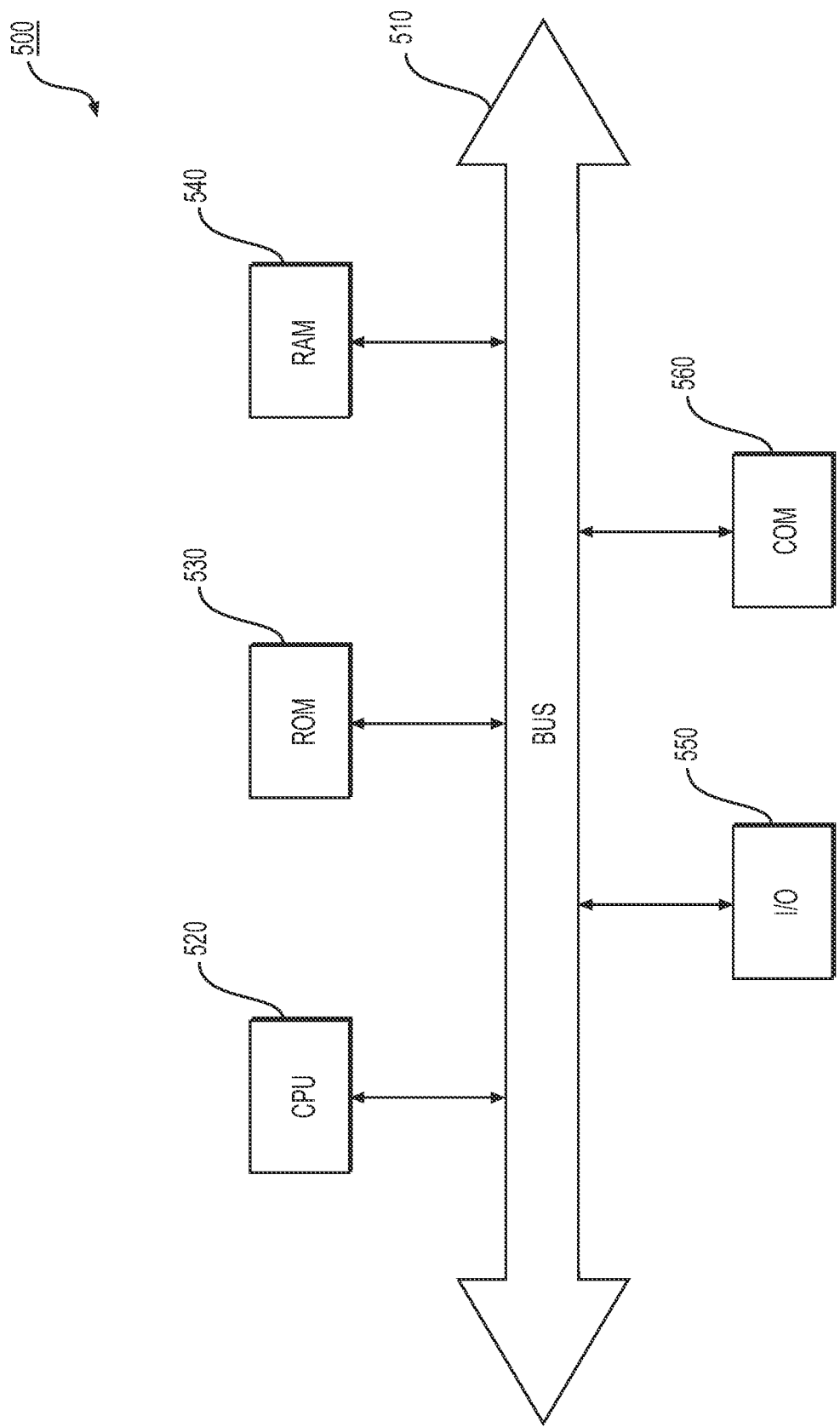
FIG. 5 is a simplified functional block diagram of a computer that may be configured as a device for executing the methods of FIGS. 2-4, according to exemplary embodiments of the present disclosure.

FIG. 5 is a simplified functional block diagram of a computer that may be configured as the network device 110s, servers, CDN, platforms, and/or exchanges for executing the methods, according to exemplary an embodiment of the present disclosure. Specifically, in one embodiment, any of the network device 110s, servers 120 or 125, CDN, platforms, and/or exchanges may be an assembly of hardware 500 including, for example, a data communication interface 560 for packet data communication. The platform may also include a central processing unit ("CPU") 520, in the form of one or more processors, for executing program instructions. The platform typically includes an internal communication bus 510, program storage, and data storage for various data files to be processed and/or communicated by the platform such as ROM 530 and RAM 540, although the system 500 often receives programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The invention claimed is:

1. A computer-implemented method for identifying human users on a network, comprising:
   receiving network data over a predetermined time period, the network data comprising one or more groupings wherein each group includes one or more user-initiated events and a corresponding network address;
   determining one or more consistency thresholds based on device usage consistency and device utilization of the one or more user-initiated events, the device usage consistency based on a number of successful login attempts from a respective IP address;
   determining qualifying pairs of the groupings, the qualifying pairs corresponding to a subset of the groupings that meet or exceed the one or more consistency thresholds;
   receiving external source information comprising whether a qualifying pair has paid for one or more features;
   determining a first user-initiated event of the qualifying pairs is associated with a non-human user, but should be associated with a human user, by comparing an IP address associated with the first user-initiated event with a list of IP addresses associated with human users and based on the qualifying pair corresponding to the first user-initiated event paying for one or more features associated with an external source; and
   adjusting the one or more consistency thresholds such that the first user-initiated event of the qualifying pairs is associated with a human user.

2. The method of claim 1, wherein a plurality of network addresses comprises a number of successful login attempts and/or a number of failed login attempts associated with each user-initiated event, and further comprising:
   determining if the each user-initiated event is associated with a human user or a non-human user based upon the number of successful login attempts and the number of failed login attempts for each of the user-initiated events.

3. The method of claim 1, further comprising:
   determining an indicia that a user is human is based on a user's address book.

4. The method of claim 1, further comprising:
   receiving additional network data associated with a plurality of known human users; and
   determining at least one of the consistency thresholds based, at least in part, on the plurality of known human users.

5. The method of claim 1, further comprising:
   associating, for the user-initiated events, a plurality of booleans with the one or more consistency thresholds;
   determining, for each user-initiated event, whether at least one of the plurality of booleans is true or false based upon whether any of the one or more consistency thresholds are met or exceeded; and
   determining if each user-initiated event is associated with a human user or a non-human user based upon whether each of the plurality of booleans is true or false.

6. The method of claim 5, further comprising:
   determining at least one uncertain user-initiated event of the plurality of user-initiated events that neither meets criteria for being associated with a human user or a non-human user;
   adjusting the one or more consistency thresholds; and
   determining if the at least one uncertain user-initiated event is associated with a human user or a non-human user based upon the adjusted one or more consistency thresholds.

7. The method of claim 1, further comprising:
   generating pairs of user-initiated events from the user-initiated events;
   determining communications between user-initiated events associated with each of the pairs of user-initiated events; and
   labeling the user-initiated events as trusted or untrusted based upon the communications between user-initiated events associated with each of the pairs of user-initiated events.

8. A system for identifying human users on a network, the system including:
   a data storage device that stores instructions for identifying human users on a network; and
   a processor configured to execute the instructions to perform a method including:
      receiving network data over a predetermined time period, the network data comprising one or more groupings wherein each group includes one or more user-initiated events and a corresponding network address;
      determining one or more consistency thresholds based on device usage consistency and device utilization of the one or more user-initiated events, the device usage consistency based on a number of successful login attempts from a respective IP address;
      determining qualifying pairs of the groupings, the qualifying pairs corresponding to a subset of the groupings that meet or exceed the one or more consistency thresholds;
      receiving external source information comprising whether a qualifying pair has paid for one or more features;
      determining a first user-initiated event of the qualifying pairs is associated with a non-human user, but should be associated with a human user, by comparing an IP address associated with the first user-initiated event with a list of IP addresses associated with human users and based on the qualifying pair corresponding to the first user-initiated event paying for one or more features associated with an external source; and
      adjusting the one or more consistency thresholds such that the first user-initiated event of the qualifying pairs is associated with a human user.

9. The system of claim 8, wherein the network addresses comprise a number of successful login attempts and/or a number of failed login attempts associated with each user-initiated event, and the method further comprising:
   determine if each user-initiated event is associated with a human user or a non-human user based upon the number of successful login attempts and the number of failed login attempts for each of the user-initiated events.

10. The system of claim 8, the method further comprising:
    determining an indicia that a user is human is based on a user's address book.

11. The system of claim 8, the method further comprising:
    receiving additional network data associated with a plurality of known human users; and
    determining at least one of the one or more consistency thresholds based, at least in part, on the plurality of known human users.

12. The system of claim 8, the method further comprising:
associating, for the user-initiated events, a plurality of booleans with the one or more consistency thresholds;
determining, for each of the plurality of user-initiated events, whether at least one of the plurality of booleans is true or false based upon whether any of the one or more consistency thresholds are met or exceeded; and
determining if each of the plurality of user-initiated events is associated with a human user or a non-human user based upon whether each of the plurality of booleans is true or false.

13. The system of claim 12, the method further comprising:
determining at least one uncertain user-initiated event of the plurality of user-initiated events that neither meets criteria for being associated with a human user or a non-human user;
adjusting the one or more consistency thresholds; and
determining if the at least one uncertain user-initiated event is associated with a human user or a non-human user based upon the adjusted one or more consistency thresholds.

14. The system of claim 8, the method further comprising:
generating pairs of user-initiated events from the user-initiated events;
determining communications between user-initiated events associated with each of the pairs of user-initiated events; and
labeling the user-initiated events as trusted or untrusted based upon the communications between user-initiated events associated with each of the pairs of user-initiated events.

15. A non-transitory computer-readable medium storing instructions that, when executed by a computer, cause the computer to perform a method for identifying human users on a network, the method including:
receiving network data over a predetermined time period, the network data comprising one or more groupings wherein each group includes one or more user-initiated events and a corresponding network address;
determining one or more consistency thresholds based on device usage consistency and device utilization of the one or more user-initiated events, the device usage consistency based on a number of successful login attempts from a respective IP address;
determining qualifying pairs of the groupings, the qualifying pairs corresponding to a subset of the groupings that meet or exceed the one or more consistency thresholds;
receiving external source information comprising whether a qualifying pair has paid for one or more features;
determining a first user-initiated event of the qualifying pairs is associated with a non-human user, but should be associated with a human user, by comparing an IP address associated with the first user-initiated event with a list of IP addresses associated with human users and based on the qualifying pair corresponding to the first user-initiated event paying for one or more features associated with an external source; and
adjusting the one or more consistency thresholds such that the first user-initiated event of the qualifying pairs is associated with a human user.

16. The computer-readable medium of claim 15, wherein the network addresses comprises a number of successful login attempts and/or a number of failed login attempts associated with each user-initiated event, and the method further comprising:
determine if each user-initiated event is associated with a human user or a non-human user based upon the number of successful login attempts and the number of failed login attempts for each of the user-initiated events.

17. The computer-readable medium of claim 15, the method further comprising:
receiving additional network data associated with a plurality of known human users; and
determining at least one or more consistency thresholds based, at least in part, on the plurality of known human users.

18. The computer-readable medium of claim 15, the method further comprising:
associating, for the user-initiated events, a plurality of booleans with the one or more consistency thresholds;
determining, for each of the plurality of user-initiated events, whether at least one of the plurality of booleans is true or false based upon whether any of the one or more consistency thresholds are met or exceeded; and
determining if each of the plurality of user-initiated events is associated with a human user or a non-human user based upon whether each of the plurality of booleans is true or false.

19. The computer-readable medium of claim 18, the method further comprising:
determining at least one uncertain user-initiated event of the user-initiated events that neither meets criteria for being associated with a human user or a non-human user;
adjusting the one or more consistency thresholds; and
determining if the user-initiated event is associated with a human user or a non-human user based upon the adjusted one or more consistency thresholds.

20. The computer-readable medium of claim 15, the method further comprising:
generating pairs of user-initiated events;
determining communications between user-initiated events; and
labeling the user-initiated events as trusted or untrusted based upon the communications between user-initiated events associated with each of the pairs of user-initiated events.

* * * * *